US006519703B1

(12) United States Patent
Joyce

(10) Patent No.: US 6,519,703 B1
(45) Date of Patent: Feb. 11, 2003

(54) METHODS AND APPARATUS FOR HEURISTIC FIREWALL

(76) Inventor: James B. Joyce, 708 Penny Ct., Ballwin, MO (US) 63011

( * ) Notice: Subject to any disclaimer, the term of this patent is extended or adjusted under 35 U.S.C. 154(b) by 0 days.

(21) Appl. No.: 09/549,417

(22) Filed: Apr. 14, 2000

(51) Int. Cl.$^7$ .......................... G06F 11/30; G06F 17/00
(52) U.S. Cl. ...................... 713/201; 709/224; 706/46
(58) Field of Search .................. 713/200, 201, 713/154; 709/223–226; 706/15, 16, 21, 22, 45–48, 50, 61, 62

(56) References Cited

U.S. PATENT DOCUMENTS

| | | | |
|---|---|---|---|
| 5,769,074 A | | 6/1998 | Barnhill et al. |
| 5,983,348 A | * | 11/1999 | Ji ................................. 713/200 |
| 5,999,932 A | * | 12/1999 | Paul ............................ 707/10 |
| 6,052,788 A | | 4/2000 | Wesinger, Jr. et al. |
| 6,108,800 A | | 8/2000 | Asawa |
| 6,119,236 A | * | 9/2000 | Shipley ....................... 713/201 |
| 6,154,844 A | * | 11/2000 | Touboul et al. ............. 713/201 |
| 6,192,477 B1 | | 2/2001 | Corthell |
| 6,219,786 B1 | * | 4/2001 | Cunningham et al. ...... 713/152 |
| 6,304,975 B1 | * | 10/2001 | Shipley ....................... 713/201 |
| 6,321,338 B1 | * | 11/2001 | Porras et al. ................ 713/201 |
| 6,357,008 B1 | * | 3/2002 | Nachenberg ................ 713/200 |
| 6,363,489 B1 | * | 3/2002 | Comay et al. ............... 713/201 |

OTHER PUBLICATIONS

Lodin et al, "Firewalls Fend Off Invasions From the Net" Feb. 1998, IEEE Spectrum, vol. 35, No. 2.*

Jackson, "Virus Bulletin" Mar. 1996, http://www.dials.ru/english/lib/vb96.htm.*

Carr, Jim "Good News/Bad News in SoS Struggle" Jul. 1, 2002, Network Magazine, p. 32.*

"Network Associates Selected by Department of Defense to Develop Next Generation Intrusion Detection Standards" Oct. 27, 1998, PR Newswire.*

Hale, Ron "The intrusion crackdown primer: Part 1" Feb. 2001, www.serverworldmagazine.com/sunserver/2001/02/intrusion.shtml.*

Hale, Ron "The intrusion crackdown primer: Part 2" Jul. 2001, www.serverworldmagazine.com/monthly/2001/07/intrusion2.shtml.*

Abramson, "Control Strategies for Two–Player Games" Jun. 1989, ACM Computing Surveys, vol. 21, No. 2, p. 137–161.*

"Microsoft Press Computer Dictionary" 1997, Microsoft Press, Third Edition, p. 231.*

* cited by examiner

*Primary Examiner*—Gail Hayes
*Assistant Examiner*—Christopher Revak
(74) *Attorney, Agent, or Firm*—Armstrong Teasdale LLP

(57) ABSTRACT

One embodiment of the present invention is a method for processing packets in a computer communication network that includes steps of analyzing a packet stream using at least a first heuristic stage trained to recognize potentially harmful packets; assigning a confidence rating to packets in the analyzed stream in accordance with a level of confidence regarding the harmfulness of the analyzed packets; and selecting packets for further analysis in accordance with their assigned confidence rating. This exemplary embodiment overcomes disadvantages of previous methods for providing firewall security and is able to learn from and adapt to data flowing through a network to provide additional network security.

40 Claims, 4 Drawing Sheets

Input Training Data Set:
    Sample Inputs {A,B,C,D}
    Sample Outputs {X,Y}

Sample Data Format Example for Feeding into Neural Network:

Assumption (C,B,A) = Y; All Other Combinations = X

1st Iteration - A,0,0,0;X
    2nd Iteration - B,A,0,0;X
    3rd Iteration - C,B,A,0;Y
    4th Iteration - D,C,B,A;X

FIG. 4

METHODS AND APPARATUS FOR HEURISTIC FIREWALL

BACKGROUND OF THE INVENTION

This invention relates generally to computer network security methods and apparatus, and more particularly to a heuristic computer firewall.

Conventional rule-based computer security firewalls are based upon varyingly complex sets of rules, or "rule bases". Data packets that enter such a firewall are compared to information in, and rules of; one or more rule bases to determine whether the data packets should be allowed to pass through the firewall. Rule bases are structured around concepts of logical comparisons (e.g., Boolean) and sequential rule flow (e.g.,. top to bottom) through a list of rules. As rule bases become more complex, they require more system and processor overhead. Consequently, organizations that use firewalls often compromise between rule base complexity and perceived required data throughput; sacrificing some amount of security in favor of performance.

Human intervention is often required to switch between simple and complex rule bases, and even the most complex rule bases process data in the same logical, linear fashion, as do the simpler rule bases. Moreover, due to data storage constraints, logical analysis limitations, and processor overhead requirements associated with large complex rule bases, conventional firewalls are static objects that are only as secure as the knowledge and ability of the firewall-administrator permits, and such firewalls do not learn from, nor adapt to, data flowing through them. Conventional firewalls thus cannot perform the pattern matching and analysis requirements associated with mitigating the security threats posed by the computer "crackers" of today and tomorrow.

It would therefore be desirable to provide methods and apparatus for a heuristic firewall that can learn from and adapt to data flowing through them to better mitigate such security threats. It would also be desirable to provide methods and apparatus that combine multiple analysis methodologies to provide a higher level of functionality than that of conventional firewalls. It would further be desirable for such methods and apparatus to address multiple areas of computer network security. Additional desirable features include providing solutions to known computer security threats, dynamically adapting to new and future computer security exploit attempts, and analyzing and responding to undesirable out-of-band (OOB) and/or covert channel communications activity.

BRIEF SUMMARY OF THE INVENTION

There is therefore provided, in one embodiment of the present invention, a method for processing packets in a computer communication network that includes steps of analyzing a packet stream using at least a first heuristic stage trained to recognize potentially harmful packets; assigning a confidence rating to packets in the analyzed stream in accordance with a level of confidence regarding the harmfulness of the analyzed packets; and selecting packets for further analysis in accordance with their assigned confidence rating.

This exemplary embodiment overcomes disadvantages of previous methods for providing firewall security and is able to learn from and adapt to data flowing through a network to provide additional network security.

BRIEF DESCRIPTION OF THE DRAWINGS

FIG. 4 is a listing exemplifying a set of training data for the neural network of FIG. 3.

It should be understood that some embodiments of the invention are implemented using software or firmware running in a suitable processor so that individual blocks in the block diagrams of the Figures do not necessarily represent separate hardware components.

DETAILED DESCRIPTION OF THE INVENTION

Figure 1:
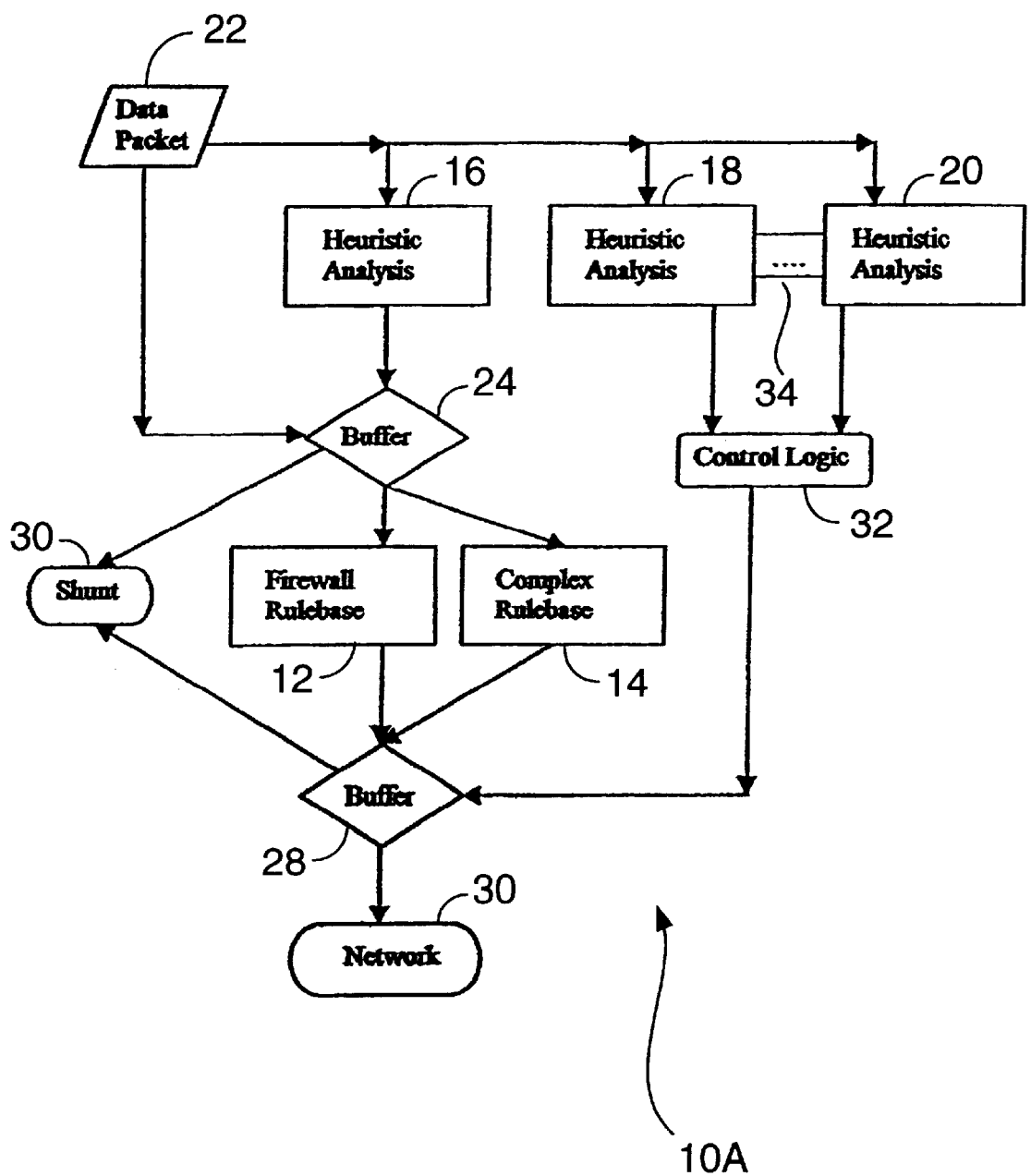
FIG. 1 is an architectural block diagram of an embodiment of a heuristic firewall the present invention.

In one embodiment of the present invention and referring to the architectural block diagram of FIG. 1, a heuristic firewall 10A is provided that combines a conventional rule base 12, 14 with various heuristic analysis algorithms 16, 18, and 20. Heuristic analysis algorithms 16, 18, and 20 provide improved pattern recognition within the firewall beyond the capabilities of the rule bases. Examples of categories of heuristic algorithms 16, 18, and 20 include, but are not limited to, "fuzzy logic" and "neural networks." Rule bases 12 and 14 may be considered as examples of "expert systems". By combining heuristic analysis algorithms with expert systems, embodiments of the present invention provide an adaptability and enhanced level of security that is not available with conventional firewalls.

Heuristic firewall 10A is comprised of multiple analysis or control stages including traditional firewall rule bases, multiple heuristic analysis routines, control logic, and supporting hardware and software (i.e. computer, operating system, communication links, data repository, parsing routines, etc.). Referring to the embodiment illustrated by FIG. 1, data packets 22 entering a firewall interface, for example via the Internet, are fanned out and directed to multiple heuristic analysis algorithm stages 16, 18, and 20, with each stage being responsible for different aspects of the overall analysis.

Raw packets 22 are also transmitted to a first buffer 24 that holds on to the packets until a decision has been made by heuristic analysis stage 16. (In an embodiment not shown, other heuristic analysis and/or control stages also contribute to this decision.) Based upon the heuristic analysis stage 16 decision, packets in buffer 22 are released to an appropriate processing stage. If the packets are deemed "high-confidence" or "good-confidence" (with respect to security, authentication, validity, etc.), they are released from first buffer 24 into a traditional firewall rule base 12 for processing. If the packets are deemed "marginal-confidence", they are released into a more complex firewall rule base 14 for processing. If the packets are deemed "poor-confidence", they are shunted 26 out of firewall 10A. (In one embodiment, the shunted packets are subject to additional analysis and/or processing to determine the reason for the low confidence. For example, an unknown or unrecognized type of attack may be occurring, and further analysis may reveal details about the source of the attack or ways to improve protection from the attack. In some cases, a connection may be established to a network simulator [not shown in FIG. 1] to encourage a "cracker" to continue what he believes to be a successful attack and thereby provide more packets for analysis and possible determination of their source.)

Acceptable packets processed by firewall rule base 12 or complex rule base 14 are accepted and sent to a second buffer 28. (In one embodiment, unacceptable packets are written to an exceptions log for later review by an administrator. In another embodiment, an option is provided to either log the unacceptable packets or log the packets and forward the data for analysis.) Based upon confidence results of one or more heuristic analyses different from that of heuristic analysis 16, packets in second buffer 28 are either shunted 26 in a manner similar to that of packets in buffer 24, or they are transmitted to network 30, for example, a corporate local or wide-area network. Control of the disposition of packets in second buffer 28 in this embodiment is determined by heuristic algorithm stage 18 and 20 analysis. Control logic 32 is provided to combine the results into a single decision for the purpose of controlling second buffer 28. Shunt 26 is, for example, a log file, an analysis stage, or a "bit bucket" such as /dev/null.

In one embodiment, heuristic processing and analysis stages 16, 18, and 20 are varied and cover several different processing and analysis methods. For example, a heuristic stage includes one or more of the following: heuristic engine(s), appropriate sample training data (input/output), heuristic algorithm(s), data preparation routine(s), transfer function(s), filter(s), normalization routine(s), convolution and/or deconvolution processing, static and/or dynamic threshold(s), impulse response(s), or other mathematical or logical component(s). Heuristic stages 16, 18, and 20 are, for example, configured to function and control or be controlled by other heuristics (e.g., control paths 34), logic (e.g., control logic 32), control, or analysis stages, etc.

Figure 2:
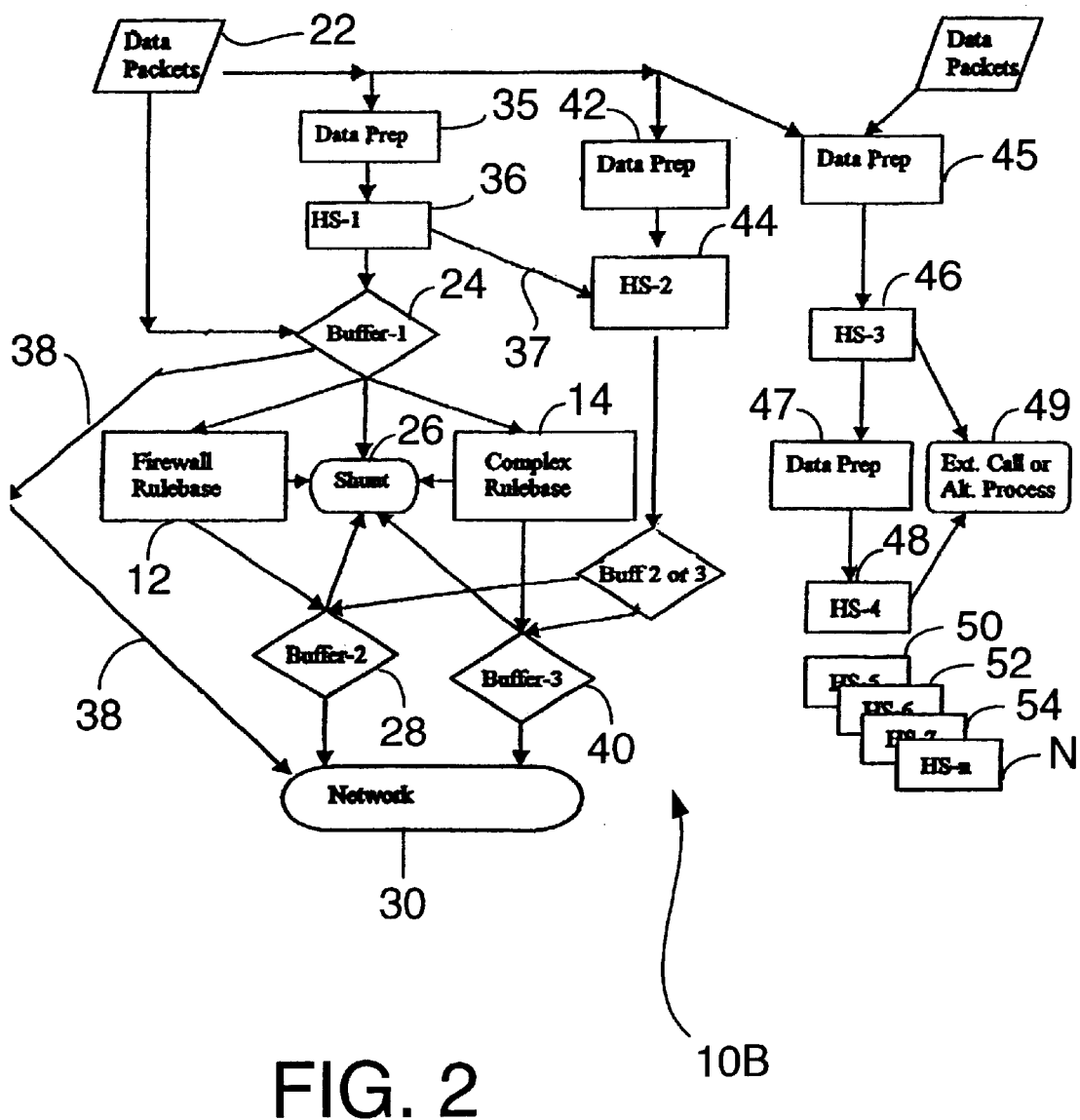
FIG. 2 is a high level block diagram of an embodiment of a heuristic firewall of the invention configured to process input data coming from the Internet.

FIG. 2 is a high level block diagram showing one embodiment of a heuristic firewall 10B of the present invention configured to process input data 22 coming from the Internet. Prior to use, heuristic firewall 10B is trained to perform specific desired tasks. In this embodiment, for example, a first heuristic stage 36 is trained to recognize absolute high-confidence traffic, computer virus and Trojan signatures, denial-of-service attack signatures, and other computer security exploit signatures. After training and during use, if heuristic stage 36 clears a packet stream with a "high-confidence" rating (i.e., an analysis of the packets 22 by heuristic stage 36 results in a high level of confidence that the packet stream does not contain threats that heuristic stage 36 is trained to detect), buffer 24 releases the packets into a secured channel 38 directly into network 30. If heuristic stage 36 processing results in only a lesser confidence rating (i.e., a "good-confidence" rating) that threats are absent, buffer 24 releases the packets into a traditional firewall rule base 12 for standard processing. In this case, the output of traditional firewall rule base 12 is buffer 28. If heuristic stage 36 determines that the packet stream is certainly corrupted or otherwise undesired or that threats are detected ("poor-confidence"), buffer 24 shunts the packets elsewhere, for example, either out of the firewall (e.g., to a "bit bucket" such as /dev/null, where they are discarded) or it shunts them elsewhere 26 for additional processing. If heuristic stage 36 is not certain as to the validity of the packets ("marginal-confidence"), buffer 24 releases the packets into complex firewall rule base 14 for processing. The output of complex firewall rule base 24 is buffer 40.

If heuristic stage 36 rates packets 22 as either good-confidence or marginal-confidence, the packets are forwarded to another heuristic stage 44. Heuristic stage 44 is pre-trained to look for temporal and other anomalies in packet streams including, but not limited to, one or more of the following: temporal attack signatures, frequency analysis, in-transit packet modification, forged-packet indicators, out-of-band (OOB) communications, and/or covert channel communications.

In the case where the heuristic stage 44 has been activated by a heuristic stage 36 "good-confidence" rating, a corresponding heuristic stage 44 rating of "poor-confidence" shunts packets to buffer 28. A heuristic stage 44 rating of "good-confidence" releases packets in buffer 28 into network 30.

In a case in which heuristic stage 44 has been activated by an heuristic stage 36 rating of "marginal-confidence," a corresponding heuristic stage 44 rating of "poor-confidence" shunts packets to buffer 40. A heuristic stage 44 rating of "good-confidence" releases packets in buffer 40 into network 30.

In one embodiment, data prep stages 35, 42, and 45 provide input data pre-processing (for example, pulling of port and time-stamp information from raw data packets 22 to feed a corresponding heuristic stage 36, 44, and 46). In addition, when heuristic stage 36 classifies data as "high-confidence," this information is communicated 37 to heuristic stage 44, which "flushes" that data without further analysis to save CPU cycles.

In one embodiment, all heuristic firewall 10B interfaces that accept packet input are configured as shown in FIG. 2. As a result, heuristic firewall 10B analyzes data originating from any side of the firewall, with respect to network interfaces. Thus, packets originating from network 30 with the Internet as their destination also enter firewall 10B and see an interface (not shown) similar to that shown for data packets 22. However, the eventual output of these packets, if they are permitted to leave firewall 10B, is the Internet. Also in one embodiment, heuristic firewall 10B is configured to reduce firewall intervention once a session has been established.

In one embodiment and referring again to FIG. 2, heuristic stage 46 is a correlation analysis stage of the heuristic firewall. Input fed into heuristic stage 46 comprises bi-directional (or multi-directional) session data. Heuristic stage 46 is pre-trained to analyze session traffic for undesirable session and/or traffic multiple-machine interaction including, for example: Trojans, denial- and distributed-denial-of-service attacks, covert channel communications, out-of-band (OOB) communications, man-in-the-middle exploits, and other unwanted traffic.

Heuristic stage 48 is also a correlation analysis stage of heuristic firewall 10B. Similarly to heuristic stage 46, heuristic stage 48 operates upon bi-directional or multi-directional session data that has been translated into the frequency spectrum, for example, by data prep stage 47. In particular, packets 22 is interpreted in more than just a linear or temporal fashion in one embodiment of the invention. For example, data packet 22 flow can be represented as curves based on a combination of packet header information, such as source and destination addresses, ports, and time-stamp information. (In this embodiment, not all data prep stages 35, 42, 45, and 47 pull such information from packets 22.) This information is analyzed for anomalies, discontinuities, and patterns that may indicate untrustworthy packets. Transforming time stamps into the frequency domain, for example, provides an opportunity to detect anomalies that are not detected by a time-domain analysis.

In the event that either of heuristic stages 46 or 48 discover problems in session data or session data flow, control is switched to an external call or alternate process 49. Examples of external call or alternate process 49 are alarms; alerting devices; pager systems providing a message to an administrator, a security officer, or the FBI; or a log file. In one embodiment, a choice is made of any or all of these examples, or of killing the session immediately, depending upon a level of severity determined by heuristic stage 46 or 48.

Additional heuristic stages 50, 52, 54, . . . , N are provided in one embodiment to effect additional security precautions. For example, heuristic stage 50 provides a differential analysis algorithm pre-trained to analyze a differential of the input packet stream 22 and possible alternative OOB and/or covert channel communications. Other heuristic stages 52, 54, etc. are configured for successive differential comparisons. For example, heuristic stage 52 is a differential of a transformed frequency analysis of heuristic stage 50 input data. This technique is extended in some embodiments by modifying impulse functions or responses to the algorithm to provide alternative heuristic stages N covering other possible OOB or covert channel communications situations.

In one embodiment, "plug and play" style heuristic modules are provided, such as a module to analyze a second differential of a time domain curve representing packet 22 flow header information, a module to analyze such a curve after it has been convolved with a Bessel function with j=1, and a module to analyze a frequency spectrum based on an alternative transform function. These analyses are compared, in one embodiment, to known codes and/or ciphers, such as Morse code and Caesar cipher, in an attempt to discover hidden or covert channel communications.

Due to system modularity, heuristic stages 50, 52, 54, . . . , N can be logically inserted, controlled and/or programmed as needed to affect any programmable desired system response. Thus, an efficient and adaptable firewall architecture 10B capable of handling present and future security needs is provided.

A suitable computer system for heuristic firewalls 10A and 10B is a SUN MICROSYSTEMS® computer system running the SOLARIS® operating system, both available from Sun Microsystems, Palo Alto, Calif. Conventional firewalls 12 and 14 are implemented using SUN SECURE™ conventional firewall software (also available from Sun Microsystems). Suitable software for implementing heuristic stages 16, 18, 20, 36, 42, 46, 48, 50, 52, 54, . . . , N is NEURAL WARE™ neural networking software available from Neural Ware, Inc., Sewickley Pa. TRADEHARBOR™ voice signature software, available from TradeHarbor, Inc., St. Louis, Mo. is also used for voice signature administration authorization, which provides additional security against unauthorized software and database changes by requiring validation of a voice signature before such changes are permitted. The computer system and software were selected because of their ability to scale to requirements at hand, and because of their performance, flexibility, and reliability characteristics. Alternative hardware and software platforms will be apparent to those skilled in the art upon reading and understanding the detailed description of the various embodiments of the invention presented herein. For example, computers based on INTEL® microprocessors (Intel Corporation, Santa Clara, Calif.) may be used instead of the SUN MICROSYSTEMS® computers, although such a design choice may also require the selection of other operating systems and/or software.

Figure 3:
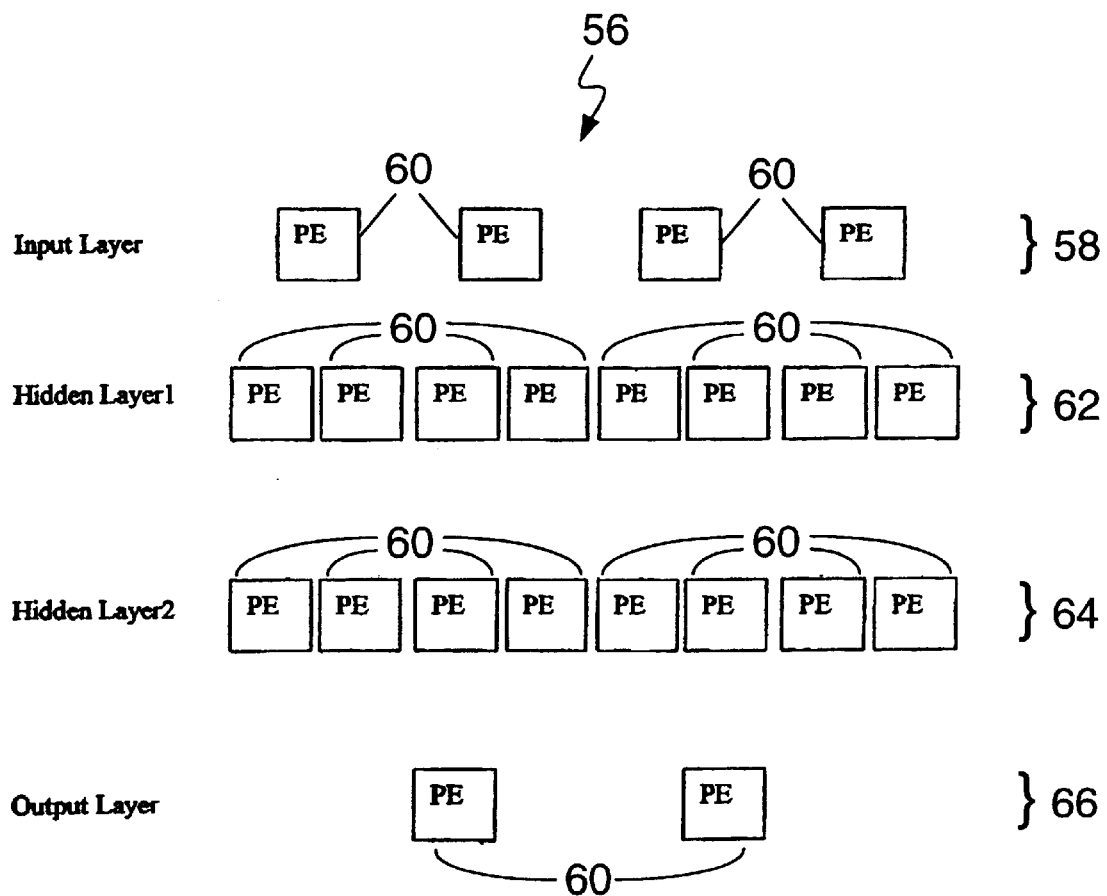
FIG. 3 is a block diagram of one embodiment of a neural network implementing a heuristic algorithm.

One embodiment of a neural network 56 implementing a heuristic algorithm is illustrated in the block diagram of FIG. 3. The illustrated embodiment utilizes a fully connected, dual hidden-layer, back-propagation, sigmoid transfer function, neural network algorithm. In this embodiment, a plurality of input layer 58 processing elements ("PEs") 60 are provided equal in number to the processor resolution.

For example, a thirty-two bit processor would be provided with thirty-two input PEs 60. (Each PE 60 is interconnected with many or all of the other PEs 60 in the embodiment shown in FIG. 3 depending upon a level of training and the need for connections between specific PEs 60 given the algorithm's adaptation to the data being processed. However, to reduce complexity of the drawing, none of these interconnections is shown.) Each of two hidden layers 62, 64 in this embodiment provide twice the number of PEs 60 as input layer 58 (for example, if there are thirty-two input PEs 60 in input layer 58, then each hidden layer 62, 64 would be provided with sixty-four PEs 60). The number of output layer 66 PEs 60 in this embodiment is at least equal the number of desired outputs from system 56. Other embodiments provide different numbers of PEs 60 and do not necessarily conform with the relationships recited above for this embodiment. For example, in one embodiment, input layer 58 is provided with a number of PEs 60 that matches the bit resolution of the system's Ethernet card. In another embodiment, at least one hidden layer 62 is used, the number of hidden layers depending upon a desire level of functionality.

When training neural network 56, accurate and appropriate data should be selected. Valid training data sets include, for example, historical input and output packet samples of the types of data for which the neural network is being trained. In one embodiment, sufficient iterations of data presentation to the neural network are run to ensure correct training, and the trained system is thoroughly tested.

In one embodiment, neural network 56 is also trained to respond to inputs with spatio-temporal independence so that it continues to learn and adapt based upon new and unfamiliar input. To ensure spatio-temporal independence, input data to neural network 56 is not input in parallel (e.g., for thirty-two input PEs, 60 as either thirty-two bits, nibbles, bytes, or words, at a time), but rather is input sequentially across the input PEs 60 of input layer 58. See, for example, the training data input example shown in FIG. 4. Embodiments of neural networks 56 employing at least the number of hidden layers 62, 64 and PEs 60 as shown and described with reference to the embodiments disclosed herein provide increased likelihood for quick adaptation to unfamiliar data. Embodiments having reduced numbers of hidden layers 62, 64 or PEs 60 may provide slightly greater "processor efficiency," but with more limited generalization and dynamic learning features.

The exemplary neural network embodiment 56 illustrated in FIG. 3 provides integrated heuristic processing with conventional techniques to realize an improved firewall. In another embodiment, the functionality of conventional techniques are replaced with heuristic processing to result in a "pure" heuristic firewall. In this embodiment, the traditional/conventional firewall rule bases 12, 14 of FIG. 2 are replaced with heuristics-based rule bases. Once trained, the heuristic rule bases are locked down, if it is desired to implement static rule bases or the heuristic rule bases are implemented as dynamic rule bases if it is desired that they continue to adapt or evolve over time, after training has been completed.

In yet another embodiment, other neural network and heuristic algorithms are used to implement various heuristic stages. For example, a Bi-directional Associative Memory (BAM) and/or an Adaptive Resonance Theory (ART) algorithm is used, but these represent just a few examples of suitable algorithms that may be used in embodiments of the present invention.

It will thus be seen that embodiments of the present invention provide heuristic firewall methods and apparatus that learn from and adapt to data flows to mitigate security threats. Multiple analysis methodologies are provided in some embodiments for enhanced security, and the heuristic nature of the firewalls provide the ability to dynamically adapt to new computer security exploits, threats, and covert communications.

Although the invention has been described in terms of various specific embodiments relating to computer network firewall systems, it will be recognized that the invention is also applicable to many other security related products including, for example, network shunt devices, network simulation systems, biometric analysis and biometric anomaly analysis systems, security architecture designs, and security information management systems. Therefore, those skilled in the art will recognize that the invention can be practiced with modification within the spirit and scope of the claims.

What is claimed is:

1. A method for processing packets in a computer communication network comprising the steps of:
   analyzing a packet stream utilizing a plurality of differently-trained heuristic stages trained to recognize potentially harmful packets;
   assigning a confidence rating to packets in the analyzed stream in accordance with a level of confidence regarding the harmfulness of the analyzed packets; and
   selecting packets for further analysis in accordance with their assigned confidence rating.

2. A method in accordance with claim 1 further comprising pre-training the first heuristic stage to recognize packets indicative of at least one member of the group consisting of computer viruses, Trojans, and denial-of-service attacks.

3. A method in accordance with claim 1 wherein selecting packets for further analysis in accordance with their assigned confidence rating comprises the steps of releasing packets ("higher confidence packets") assigned a level of confidence indicative of higher confidence of the packets not being harmful, and further analyzing packets ("lesser confidence packets") assigned a level of confidence indicative of lesser confidence of the packets not being harmful.

4. A method in accordance with claim 3 wherein further analyzing lesser confidence packets comprises analyzing the lesser confidence packets utilizing a first rule base.

5. A method in accordance with claim 4 further comprising the steps of assigning a confidence rating intermediate to the confidence ratings of the lesser confidence packets and higher confidence packets to at least some packets ("marginal confidence packets"), and analyzing the marginal confidence packets utilizing a second rule base.

6. A method in accordance with claim 5 further comprising the step of analyzing the marginal confidence packets with a second heuristic stage.

7. A method in accordance with claim 6 further comprising training the second heuristic stage to recognize packets indicative of at least temporal anomalies in packet streams.

8. A method in accordance with claim 7 wherein training the second heuristic stage to recognize packets indicative of at least temporal anomalies in packet streams comprises training the second heuristic stage to recognize at least one member of the group consisting of temporal attack signatures, frequency signatures, in-transit packet modification, forged-packet indicators, out-of-band (OOB) communications, and covert channel communications.

9. A method in accordance with claim 6 further comprising the step of selectively releasing packets analyzed by the first rule base in accordance with a confidence rating assigned by the second heuristic stage.

10. A method in accordance with claim 9 further comprising the step of the first heuristic stage assigning a confidence rating intermediate to the confidence ratings of the lesser confidence packets and higher confidence packets to at least some packets ("marginal confidence packets"), analyzing the marginal confidence packets utilizing a second rule base, selectively releasing packets analyzed by the first rule base in accordance with a confidence rating assigned by the second heuristic stage, and selectively releasing packets analyzed by the second rule base in accordance with a confidence rating assigned by the second heuristic stage.

11. A method in accordance with claim 1 further comprising the steps of shunting packets analyzed and determined to be harmful to a network simulator.

12. A method in accordance with claim 1 performed on both an incoming and outgoing packet stream.

13. A method in accordance with claim 1 wherein analyzing a packet stream utilizing a plurality of differently-trained heuristic stages comprises analyzing a packet stream utilizing a heuristic stage trained to analyze packet streams transformed into a frequency domain.

14. A method in accordance with claim 1 wherein analyzing a packet stream utilizing a plurality of differently-trained heuristic stages comprises analyzing a packet stream utilizing a heuristic stage trained to analyze a differential of the packet stream.

15. A method in accordance with claim 1 wherein analyzing a packet stream utilizing a plurality of differently trained heuristic stages comprises analyzing a packet stream utilizing heuristic stages configured to analyze successive differential comparisons.

16. A method in accordance with claim 1 wherein selecting packets for further analysis in accordance with their assigned confidence rating comprises the steps of releasing packets ("higher confidence packets") assigned a level of confidence indicative of higher confidence of the packets not being harmful, and further analyzing packets ("lesser confidence packets") assigned a level of confidence indicative of lesser confidence of the packets not being harmful utilizing at least a second heuristic stage.

17. A method for processing packets in a computer communication network comprising:
    analyzing a packet stream using at least a first heuristic stage trained to respond to inputs with spatio-temporal independence;
    assigning a confidence rating to packets in the analyzed stream in accordance with a level of confidence regarding the harmfulness of the analyzed packets; and
    selecting packets for further analysis in accordance with their assigned confidence rating.

18. A method in accordance with claim 17 wherein analyzing a packet stream utilizing a first heuristic stage comprises the step of analyzing the packet stream utilizing a fully-connected, dual hidden-layer, back-propagation, sigmoid transfer function, neural network algorithm.

19. A computer network firewall configured to:
    analyze a packet stream using at least a first heuristic stage trained to recognize potentially harmful packets;
    assign a confidence rating to packets in the analyzed stream in accordance with a level of confidence regarding the harmfulness of the analyzed packets; and
    select packets for further analysis in accordance with their assigned confidence rating.

20. A firewall in accordance with claim 19 wherein the first heuristic stage is pre-trained to recognize packets indicative of at least one member of the group consisting of computer viruses, Trojans, and denial-of-service attacks.

21. A firewall in accordance with claim 19 wherein said firewall being configured to select packets for further analysis in accordance with their assigned confidence rating comprises said firewall being configured to release packets ("higher confidence packets") assigned a level of confidence indicative of higher confidence of the packets not being harmful, and to further analyze packets ("lesser confidence packets") assigned a level of confidence indicative of lesser confidence of the packets not being harmful.

22. A firewall in accordance with claim 21 wherein said firewall being configured to further analyze lesser confidence packets comprises said firewall being configured to analyze the lesser confidence packets utilizing a first rule base.

23. A firewall in accordance with claim 22 further configured to assign a confidence rating intermediate to the confidence ratings of the lesser confidence packets and higher confidence packets to at least some packets ("marginal confidence packets"), and to analyze the marginal confidence packets utilizing a second rule base.

24. A firewall in accordance with claim 23 further configured to analyze the marginal confidence packets using a second heuristic stage.

25. A firewall in accordance with claim 24 wherein said second heuristic stage is trained to recognize packets indicative of at least temporal anomalies in packet streams.

26. A firewall in accordance with claim 25 wherein said second heuristic stage is trained to recognize at least one member of the group consisting of temporal attack signatures, frequency signatures, in-transit packet modification, forged-packet indicators, out-of-band (OOB) communications, and covert channel communications.

27. A firewall in accordance with claim 24 further configured to selectively release packets analyzed by the first rule base in accordance with a confidence rating assigned by the second heuristic stage.

28. A firewall in accordance with claim 27 further configured so that the first heuristic stage assigns a confidence rating intermediate to the confidence ratings of the lesser confidence packets and higher confidence packets to at least some packets ("marginal confidence packets"), the firewall also being configured to analyze the marginal confidence packets utilizing a second rule base, selectively release packets analyzed by the first rule base in accordance with a confidence rating assigned by the second heuristic stage, and selectively release packets analyzed by the second rule base in accordance with a confidence rating assigned by the second heuristic stage.

29. A firewall in accordance with claim 19 further configured to shunt packets analyzed and determined to be harmful to a network simulator.

30. A firewall in accordance with claim 19 configured to operate on both an incoming and an outgoing packet stream.

31. A firewall in accordance with claim 19 wherein said firewall being configured to analyze a packet stream using at least a first heuristic stage trained to recognize potentially harmful packets comprises said firewall being configured to analyze a packet stream utilizing a plurality of differently-trained heuristic stages.

32. A firewall in accordance with claim 31 wherein said firewall being configured to analyze a packet stream utilizing a plurality of differently-trained heuristic stages comprises said firewall being configured to analyze a packet stream utilizing a heuristic stage trained to analyze a packet stream transformed into a frequency domain.

33. A firewall in accordance with claim 31 wherein said firewall being configured to analyze a packet stream utilizing a plurality of differently-trained heuristic stages comprises said firewall being configured to analyze a packet stream utilizing a heuristic stage trained to analyze a differential of the packet stream.

34. A firewall in accordance with claim 31 wherein said firewall being configured to analyze a packet stream utilizing a plurality of differently trained heuristic stages comprises said firewall being configured to analyze a packet stream utilizing heuristic stages configured to analyze successive differential comparisons.

35. A firewall in accordance with claim 19 wherein said firewall being configured to analyze a packet stream using at least a first heuristic stage trained to recognize potentially harmful packets comprises said firewall being configured to analyze a packet stream using at least a first heuristic stage trained to respond to inputs with spatio-temporal independence.

36. A firewall in accordance with claim 35 wherein said firewall being configured to analyze a packet stream utilizing a first heuristic stage comprises said firewall being configured to analyze the packet stream utilizing a fully-connected, dual hidden-layer, back-propagation, sigmoid transfer function, neural network algorithm.

37. A firewall in accordance with claim 35 wherein said first heuristic stage comprises an input layer comprising a plurality of input layer processing elements, at least one hidden layer of processing elements, and an output layer of processing elements.

38. A firewall in accordance with claim 37 wherein said firewall comprises a processor having an n-bit resolution, and the input layer comprises n processing elements.

39. A firewall in accordance with claim 38 wherein each said hidden layer of processing elements comprises 2n processing elements.

40. A firewall in accordance with claim 19 wherein said firewall being configured to select packets for further analysis in accordance with their assigned confidence rating comprises said firewall being configured to release packets ("higher confidence packets") assigned a level of confidence indicative of higher confidence of the packets not being harmful, and further analyze packets ("lesser confidence packets") assigned a level of confidence indicative of lesser confidence of the packets not being harmful utilizing at least a second heuristic stage.

* * * * *